United States Patent Office 3,185,264
Patented May 25, 1965

3,185,264
VEHICLE HAND BRAKE COMPRISING A SERVO DEVICE INSERTED IN THE LINKAGE BETWEEN THE BRAKE AND A BRAKE LEVER COOPERATING WITH A LOCKING DEVICE
Carl Johan Nordström and John Fritiof Rönnhult, Sodertalje, Sweden, assignors to Aktiebolaget Scania-Vabis, Sodertalje, Sweden, a corporation of Sweden
Filed July 5, 1962, Ser. No. 207,614
Claims priority, application Sweden, July 4, 1961, 6,956/61
1 Claim. (Cl. 188—265)

Hand brakes comprising servo devices or so-called hand brake power amplifiers working with some sort of a fluid under pressure are known in the art. Such amplifiers are either of the single-chamber type or of the two-chamber type. When the brake is released atmospheric pressure prevails in the first named type on both sides of a piston enclosed by a cylinder, which piston is adapted to act upon the braking mechanism via a piston rod. On applying a brake of this type fluid under pressure is supplied to one side of the piston. In contrast thereto, in the two-chamber type both sides of the piston are loaded by the fluid under pressure in the released condition of the brake, and on braking one of the chambers of the cylinder is emptied so that atmospheric pressure prevails on the corresponding side of the piston, whereas the other side of the piston is still acted upon by the fluid under pressure.

As compared with the single-chamber type the two-chamber type offers the advantage that fluid under pressure immediately is available at the piston. Consequently, on starting the braking operation conduits and brake chambers need not be filled with the result of a certain delay of the braking operation. The present invention has for its object to improve hand brake power amplifiers of the two-chamber type. However, the invention may also be substantially applied to hand brake power amplifiers of the single-chamber type.

In order to explain the significance of the improvements according to the invention, the principle of construction and mode of operation of previously known hand brake power amplifiers of the two-chamber type will be briefly described. A conventional embodiment of the two-chamber type consists substantially of a cylinder having endwalls and enclosing a movable piston which is sealed at the circumference. The rod of the piston extends through central holes in the endwalls. One end of the piston rod is connected to the wheel brakes of the vehicle and its other end is connected to a braking lever. The piston rod is in the form of a valve case which houses a control valve for the fluid under pressure. The valve can be controlled by the brake lever through the intermediary of a control rod which is surrounded by one tubular end of the piston rod and is slightly axially movable relative to the piston rod and piston. Further, the end of the piston rod which is connected to the brake lever is provided with a safety lock of the roller catch type which without resistance permits movement of the piston rod and piston in the brake applying direction, but prevents unintentional return of the piston rod from the braking position. Even if in a braked vehicle the fluid under pressure would disappear even out of the braking chamber, it follows that the brake cannot be released as long as the piston rod is retained by the safety lock. Only when the brake lever which is provided with its own locking device of the detent type is returned toward the releasing position, the locking action of the safety lock, too, will come to an end so that the wheel brakes can be released.

If it were not for the above named safety lock the tension exerted on the linkage by the force of the piston would be entirely or partly transmitted to the detent lock of the brake lever in case of pressure losses in the amplifier. If in such case the amplifier is located at a long distance from the detent lock the increased resiliency of the linkage will result in a detrimental decrease of the tension and, consequently, of the braking action at the wheels. Therefore, it will be obvious that the safety lock serves to eliminate the consequences of a loss of pressure in the amplifier.

Due to the present invention the roller catch can be omitted without the risk of a loss of pressure in the amplifier reducing the braking action upon application of the hand brake, thus resulting in simplification and economy. More particularly, the invention relates to a vehicle hand brake comprising a servo device inserted in the linkage between the brake and a brake lever cooperating with a locking device, and in its broadest aspect the invention is characterized in that the servo device is located close to the locking device. Preferably, the servo device and the locking device are supported by a common frame. In the event of a loss of pressure in the amplifier the original tension on the linkage is directly transmitted to the detent lock without any further force-reducing elongation of the linkage. In accordance with the invention, the amplifier is preferably of the bellows type instead of the piston type, thereby reducing the possibilities of pressure losses. According to an embodiment of the invention an element connected to the brake lever and adapted to act upon a valve device for the servo device is provided with a piston or similar member loaded by the pressure in the working chamber of the servo device such that a manual force proportional to the desired tension on the linkage is required to apply the brake. A change gear adapted to be thrown in if required may be inserted between the brake lever and the servo device, which gear renders possible complete application of the brake by manual force only when the fluid pressure system for some reason or other is out of operation.

The invention will be described more closely hereinbelow with reference to the annexed drawings which illustrate embodiments of the invention. FIGS. 1a, 1b and 1c are diagrammatic sectional views of a hand brake comprising a pneumatic air operated servo device according to the invention in three different positions of operation. FIG. 3 is a sectional view along the line 3—3 in FIG. 1a, and FIG. 4 a top view of the lever device shown in FIG. 1a. FIGS. 9 to 11 illustrate diagrammatically an arrangement in which the brake lever is located remote from its locking segment and the servo device. In these three views, FIG. 12 illustrates a modified arrangement of the same type. FIGS. 13 to 16 show a modified embodiment of the device according to FIGS. 5 to 8, while FIGS. 17a to i illustrate the positions of certain elements, included in the device according to FIG. 13, during different steps of a brake releasing manoeuvre.

Figures 1A, 1B, 3, 4:
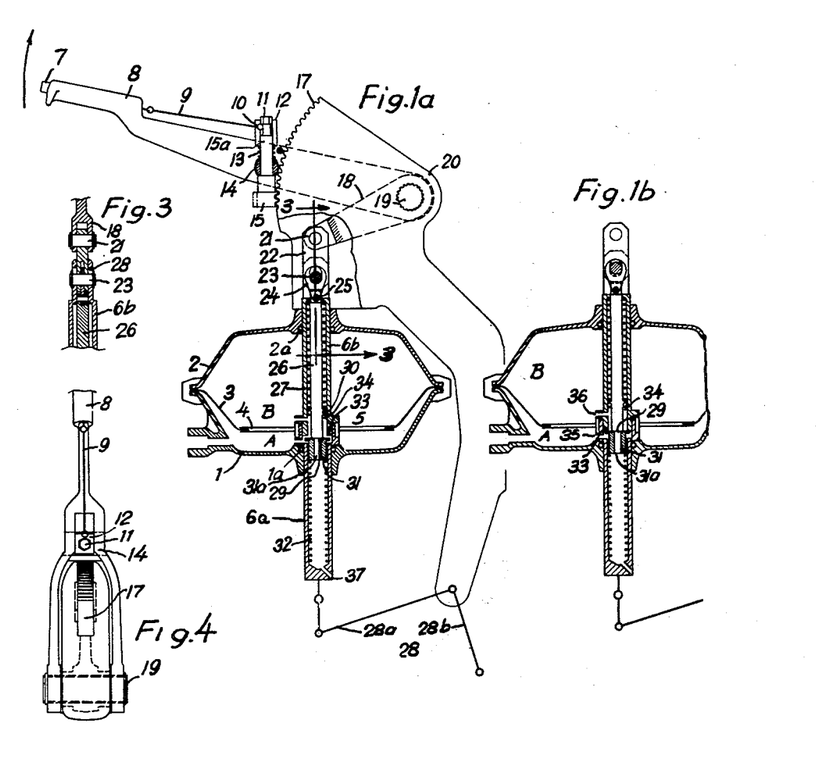

Referring to FIG. 1a the amplifier is of the two-chamber type and secured to a frame 20 which also supports the brake lever 8 and a pivotally mounted bell crank 28.

The brake lever is associated with a locking device 10–15 which is operable by means of a push button 7 and cooperates with a locking segment 17.

The locking device which replaces a pawl of conventional type will be described later on in detail with reference to FIG. 4.

The free end of a lever 18 rigidly secured to the brake lever 8 is by means of a pivot 21 connected to a link 22 which in turn by means of a pivot is connected to a link 24. The link 24 is by means of a third pivot 25 connected to a control rod 26 for a valve device to be described later on. The pivot 23 which interconnects the links 22 and 24 is movably connected to, and has a certain lost motion relative to, the upper part 6b of a piston rod or bellows rod 6a–6b. As will be seen from FIGS. 1a and 3, the pivot 23 is received in oblong holes 28 in the bifurcated part 6b of the bellows rod. Due to this lost motion the control rod 26 is slightly movable axially relative to the bellows rod 6a–6b. The control rod is guided by a central bore in the upper part of the bellows rod and loaded by a helical spring 27 in the direction corresponding to the releasing movement of the brake.

The intermediate part of the bellows rod 6a–6b is in the form of a case for a valve device which controls the supply and discharge of air under pressure. The lower part 6a is pivotally connected with one arm 28a of the bell crank 28 which is mounted on the frame 20 and the other arm 28b of which is pivotally connected to links, not shown, of the wheel brakes.

The bellows rod 6a–6b is guided in central holes in two case halves 1 and 2 between which the outer sealing edge of a flexible bellows is clamped. The central part of the bellows is tightly connected to a collar 4 on the valve case 5. As a result, the bellows 3 forms a chamber A together with the case half 1 and a chamber B together with the case half 2. Both parts of the bellows rod are sealed by means of sealing rings 1a and 2a, respectively, provided in the guide holes.

Figure 1C:
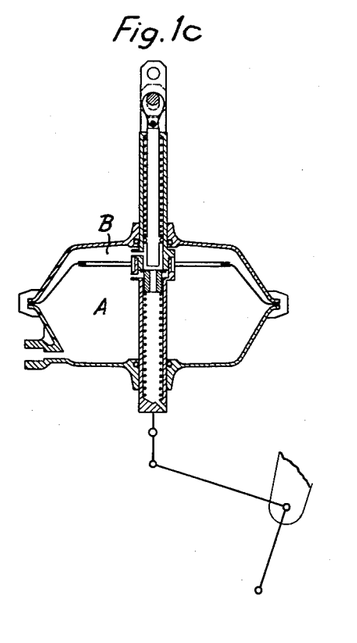

In the valve device according to FIGS. 1a, 1b and 1c the end of the control rod 26 loaded by the spring 27 and located within the valve case 5 is in the form of a plane valve seat 29. A sealing ring 30 received in a groove in the control rod seals this rod with respect to the bore in the upper part 6b of the bellows rod so that air under pressure is prevented from flowing along the control rod.

In accordance with the invention, the open end of a central bore in the lower part of the bellows rod receives a tubular valve 31 which is sealed by an external sealing ring and the plane end face of which is directed toward the valve seat 29 on the control rod 26 and in the released condition of the brakes is in sealing contact with said valve seat. The valve 31 is loaded by a helical spring 32 located in the abovenamed bore in the lower part of the bellows rod. The diameter of the valve 31 is sufficiently great to cover the valve seat 29 as well as an annular valve seat 33 located in the valve case. An annular clearance 34 is provided between the seat 33 and the control rod 26. The valve 31 has a tightening coating of rubber or similar material.

In the open position of the valve the clearance 34 communicates through openings 35 with the chamber A and through openings 36 with the chamber B. The central hole 31a in the valve 31 has for its purpose, during braking operation, to permit the air under pressure in the chamber B to escape to atmosphere through the bore in the lower part of the bellows rod and through a vent 37.

In the detent lock for the brake lever shown in FIGS. 1a and 4 the catch is in the form of a worm 15 cooperating with a correspondingly toothed locking segment 17. A shank 15a of the worm 15 is rotatably mounted in a pivot 14 which in turn is pivotally mounted on the brake lever 8. The shank 15a has a hexagon head 11 which normally is prevented from turning movement by a sleeve 12 which is displaceable on the shank 15a and biased by a spring 13 which keeps the sleeve in engagement with a limiting stop 10. The sleeve is further guided by the bifurcated brake lever 8 which prevents turning movement of the sleeve.

The mode of operation of the amplifier in cooperation with the brake lever will appear from the following description with reference to FIGS. 1a, b, c. FIG. 1a shows the condition with released hand brake, FIG. 1b at the beginning of the braking operation, and FIG. 1c the condition with applied and locked hand brake.

In the condition according to FIG. 1a the brake lever 8 is in released position which in the exemplified embodiment is substantially horizontal. The bellows rod 6a–6b, the valve device and the bellows 3 assume their lower end positions with the bellows consequently incurved in the convex half 1 of the case, the chamber A being considerably smaller than the chamber B. The chamber A is in permanent communication with a pressurized air chamber, not shown, which receives air under pressure from a compressor. Consequently, the same superatmospheric pressure prevails in the chamber A as in the pressurized air chamber. Since with released brakes the valve 31 is open (FIG. 1a), the chamber B is in open communication with the chamber A and the pressurized air chamber. Consequently, full working pressure is prevailing on both sides of the bellows 3, and no force is exerted upon the lower part of the bellows rod.

If now the brake lever and, consequently, the lever 18 are turned in the direction of the arrow the links 22 and 24 as well as the control rod 26 will be slightly moved upwards. In a certain position, the valve 31 comes into contact with the valve seat 33 (FIG. 1b). While the same superatmospheric pressure is still prevailing in both chambers, chamber B is separated from chamber A which still communicates directly with the pressurized air chamber. In this position, the valve 31 still effects a seal with respect to the valve seat 29 of the control rod.

Upon further movement of the brake lever the condition shown in FIG. 1c will be obtained. Since the valve 31 is in sealing contact with the valve seat 33, it cannot continue its movement, whereas the valve seat 29 on the control rod has been somewhat removed from the valve 31. As a result the compressed air previously enclosed in the chamber B will be discharged to the ambient air between the valve 31 and the valve seat 29 and further through the hole 31a in the valve 31, the bore of the part 6a of the bellows rod and through the vent 37. As a result, the bellows will be forced upwards by the pressure in the chamber A.

When the brake lever and the wheel brakes are fully applied and locked, the bellows 3 is incurved in the upper half 2 of the casing, as shown in FIG. 1c. The chamber A is now pressurized and considerably larger than the chamber B in which atmospheric pressure prevails.

If now the hand brake is to be released while superatmospheric pressure still prevails in the chamber A, it is merely necessary, in the conventional manner, to pull the lever 8 enough to relieve the locking pressure, to lift the worm-like catch 15 by pushing the button 7, and to return the brake lever to the releasing position. It will be appreciated that the locking device is under a comparatively low load as long as a sufficient superatmospheric pressure is prevailing in the chamber A. During the returning movement of the brake lever the valve seat 29 of the control rod closes the outlet from the chamber B through the hole 31a whereupon the valve 31 opens the connection between the chambers A and B so that the last named chamber will be filled again with air under pressure. The amplifier is now ready for the next braking operation.

If the vehicle has been at a standstill for some time with the hand brake applied, one has to expect that the superatmospheric pressure in the chamber A and in the air reservoir has entirely or partly disappeared. In this event the locking device 10–15 is likely to be loaded to so high an extent that it is not possible to release the locking catch in the usual manner. In such case, the non-turnable sleeve 12 is forced down by means of a socket wrench, and the hexagon head 11 and worm-like catch 15 are turned in a direction such as to move the brake lever 8 in the brake releasing direction. When in this manner the tension on the transmission system of the wheel brakes and, consequently, on the locking device has been sufficiently reduced, the locking device can be released in the usual manner by means of the push button 7 and the brake lever can be fully returned to the releasing position. Thereupon the air reservoir and the hand brake power amplifier have to be filled with air under normal working pressure before the vehicle is started.

The above described valve device is distinguished by the fact that it is particularly simple and requires a minimum of manual force because of the brake lever normally serving substantially as a valve operating member. In fact, the power amplifier performs substantially the entire braking effort. In contrast thereto and as mentioned above the modified valve device illustrated in FIGS. 2a, 2b and 2c serves to apply a braking power at the wheel brakes which is proportional to the force exerted on the brake lever, this being of particular importance if the hand brake is used as an emergency brake. To this end, the inner end of the control rod 39 loaded by the helical spring 38 is provided with a control piston 40 which is tightened by a nut 41. On its front side the piston 40 has a cylindrical collar which forms an annular valve seat 42 best seen in FIG. 2c. A sealing ring 43 inserted in a groove in the bore in the upper part 44b of the composite bellows rod 44a–b effects a seal with respect to the hub 45 of the piston 40, thereby preventing fluid under pressure from making its way along the control rod 39.

As in case of the valve device according to FIGS. 1a, 1b and 1c there is provided an axially movable valve 46 in the bore of the lower part 44a of the bellows rod, said valve being loaded by a helical spring 47. In the present instance, the plane end surface of the valve faces the annular valve seat 42 on the control piston 40 and is in sealing contact with this valve seat when the brake is released. The movement of the valve in the biasing direction of the spring 47 is limited by a washer 48 which forms a valve seat 49 in coaxial relation to the valve seat 42. The washer 48 is secured to a flange 50, which is rigidly connected with the bellows rod 44a–b and tightly connected to the bellows 51. The diameter of the valve 46 is large enough to permit the valve to cover both valve seats 42 and 49. The control piston 40 and the valve 46 are enclosed by the central part of the piston rod 44a–b which forms a valve case 52.

On the side of the washer 48 that faces the valve 46 and between the valve case 52 and the chamber A there are provided one or more connecting ducts 53, and on the other side of the washer there are provided similar ducts 54 which connect the valve case 52 with the chamber B. Further ducts 55 are provided between the chamber A and the rear side of the piston 40. As in the case of FIG. 1a the valve 46 has a central bore and a vent is also provided between the bore of the lower bellows rod 44a and the ambient air.

Figure 2A:
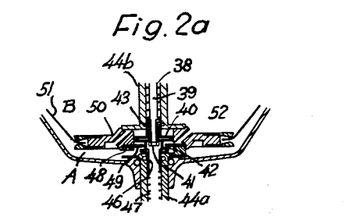
FIGS. 2a, 2b and 2c illustrate three different positions of a modified construction of a valve device comprised in the arrangement according to FIGS. 1a, b, c.
Figure 2B:
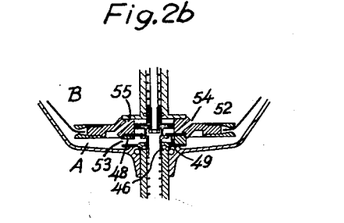
Figure 2C:
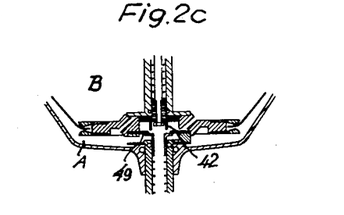

The mode of operation of the valve device according to FIGS. 2a, 2b and 2c is as follows. In the condition shown in FIG. 2a the chamber B communicates directly with the chamber A through the ducts 54 and 53. Consequently, the same superatmospheric pressure prevails on either side of the bellows 51. Through the ducts 55 the superatmospheric pressure also acts on the rear side of the control piston 40 and substantially balances the pressure on the front side of the piston.

When the braking operation is started the control rod 39 pulls the piston 40 along with it so that the valve 46 comes into contact with the valve seat 49, thereby interrupting the connection between the chambers A and B. Upon continued movement of the control rod in the same direction the valve seat 42 of the control piston comes out of contact with the now stationary valve 46, and air escapes to atmosphere out of the chamber B and through the hole in the valve 46 (FIG. 2c). However, the pressure on the front side of the control piston is also reduced, whereas the rear side of the piston is still subjected to superatmospheric pressure. The pressure difference acting on the control piston tends again to interrupt the connection between the valve seat 42 and the valve 46 and to open the communication between the valve 46 and the valve seat 49. According as the required tensile force on the lower bellows rod 44a increases it is therefore necesary to pull harder on the brake lever in order to prevent refilling of the chamber B and consequent reduction of the tractive force of the power amplifier.

With fully applied and locked hand brake the control piston 40 is in its upper end position according to FIG. 2c and atmospheric pressure prevails in the chamber B. Release of the hand brake is effected in a similar manner as in the arrangement according to FIGS. 1a, 1b and 1c.

If for some reason or other the air pressure system of the vehicle is inoperative the brake should be able to be applied by manual operation only. In case of heavy vehicles the required braking effort would, however, be so great that the manual force would not be sufficient for complete application of the brake by means of a simple brake lever of the type shown in FIG. 1a. FIGS. 5 to 8 illustrate a hand brake comprising a servo device wherein the brake lever is combined with a change gear which if required can be used as a substitute for a failing servo action.

In the embodiment according to FIGS. 5 to 8 the brake lever is composed of two parts pivotable relative each other, namely, a lever part 8a provided with a handle and a push button 7 loaded by a spring 90, and a lever part 8b which is mounted on a pivot 56 secured to the frame 20. The two articulated parts of the brake lever are bifurcated, and the prongs 57 of the lever part 8b enclose the prongs 58 of the lever part 8a. Holes provided in all of the prongs receive a pivot 59 which in the outer prongs 57 is mounted in bushes 60 and is axially fixed such as by means of locking rings 61 provided on the projecting ends of the pivot.

Figure 5:
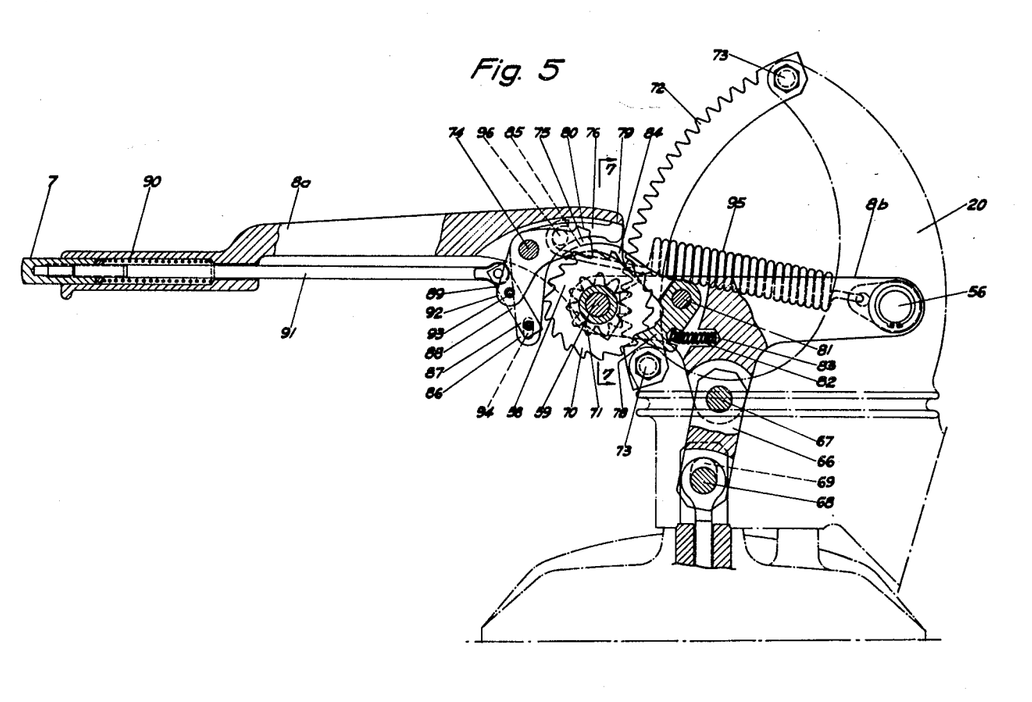
FIG. 5 is a sectional view along the line 5—5 in FIG. 6 of a hand brake lever combined with a servo device and a change gear.
Figure 6:
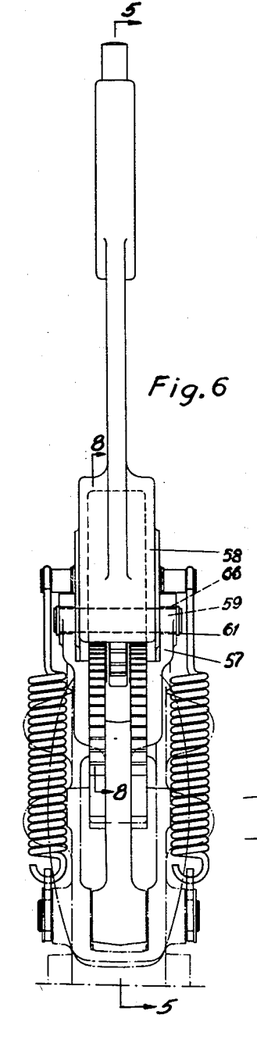
FIG. 6 is a top view of the brake lever device.
Figure 7:
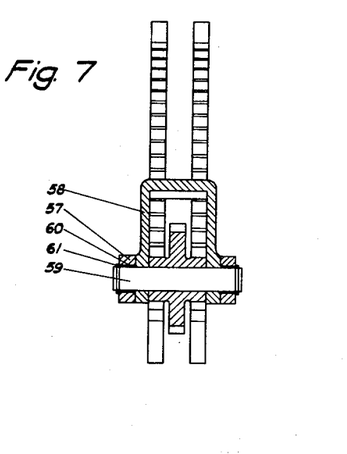
FIG. 7 is a sectional view along the line 7—7 in FIG. 5 with certain parts omitted.
Figure 8:
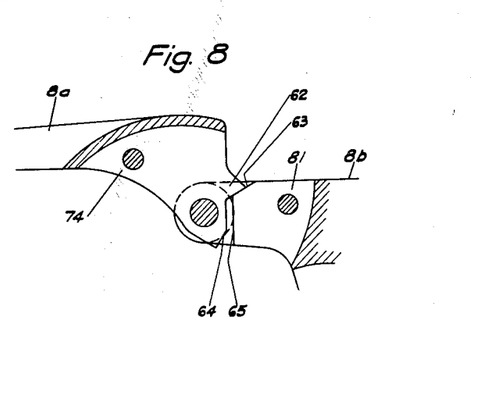
FIG. 8 is a vertical sectional view along the line 8—8 in FIG. 6 showing the split brake lever according to FIG. 5 with certain parts omitted for the sake of clearness.

The mutual swinging movement of the lever parts in the brake applying direction is limited, in the position shown in FIG. 5, by a follower dog 62 which is provided on the lever part 8a and abuts a corresponding inclined surface 63 of the lever part 8b (FIG. 8). In this position the lever part 8a can directly move the lever part 8b in the brake applying direction. Below the center of the pivot 59 the prongs 58 have inclined surfaces 64 which on swinging movement of the lever part 8a in the brake releasing direction engage the surface 65 of the lever part 8b so as to limit the mutual movements of the lever parts in said direction.

By means of the links 66 and pivots 67 and 68 the part 8b is connected both with the previously mentioned control rod 26 and with the upper bellows rod 6b. Similar to the arrangement shown in FIGS. 1 and 3 the pivot 68 is received in oblong holes 69 in the bifurcated end of the bellows rod.

The pivot 59 carries a ratchet 70 integral with two pinions 71 on either side of the ratchet. The pinions are in mesh with two toothed segments 72 which by means of bolts 73 are rigidly secured to the frame 20.

A pivot 74 provided on the lever part 8a carries a pawl 75 and two bell cranks 76. The pawl 75 normally engages the ratchet 70 and can turn the ratchet in the brake applying direction of the brake lever, but not in the opposite direction.

The bell cranks 76 provided on either side of the pawl 75 serve to render possible disengagement of a second pawl 78 provided on the lever part 8b by means of the lever part 8a. The pawl 78 also cooperates with the ratchet 70 and effects locking of the hand brake through the intermediary of the abovenamed pinions and toothed segments.

Both bell cranks 76 and the firstnamed pawl 75 are provided with dogs 79 and 80, respectively, to limit their movements in the direction corresponding to disengagement of the pawls.

The pawl 78 provided on the lever part 8b is pivotally mounted on a pivot 81 and is normally maintained in engagement with the ratchet by a helical spring 82 which abuts the bottom of a bore 83 in the lever part 8b. In engaged position the pawl 78 prevents the ratchet from turning relative to the lever part 8b.

In order to enable the pawl 78 to be actuated by the bell cranks 76 irrespective of the mutual angular position of the lever parts, this pawl is provided with arcuate arms 84, and the contact surfaces 85 cooperating with the bell cranks are in the form of arcs having their centers located in the pivot 59.

The free ends 86 of the bell cranks 76 are articulated to one end 87 of a two-armed lever 88 the other end 89 of which is articulated to the push 91 for the push button 7, which push rod is loaded by a helical spring 90. The free end 92 of the pawl 75 is articulated to a point 93 located between the two outer pivots of the lever 88. In the manner described hereinbelow the two pawls 75 and 78 can be disengaged together or individually by pressing in the push button 7. In order to enable the pawl 75 to move independently of the bell cranks 76, the cranks have oblong holes 94 at the place of connection to the lever 88. The compression spring 90 tends to retain the pawl 75 in engaged position and to keep the bell cranks 76 out of contact with the arm 84 of the pawl 78. In order to retain the dog 62 on the lever part 8a in engagement with the abutting surface 63 of the lever part 8b, a helical tension spring 95 is provided between the pivot 56 and a bolt 96 on the lever part 8a above the pivot 59. The spring 95 tends to swing the lever part 8a in a clockwise direction relative to the lever part 8b.

MODE OF OPERATION

I. *With pneumatic operation*

*Application.*—If the lever part 8a is moved upwards from the initial position shown in FIG. 5 it takes along with it the lever part 8b which through the intermediary of the links 66 in a conventional manner acts upon the valve device of the hand brake power amplifier. The lever parts 8a and 8b move together as a single unit, and the pinions 71 are rolling freely on the toothed segments 72. At the same time, the ratchet 70 rotates in a direction such that the pawls 75 and 78 are sliding over the teeth of the ratchet.

After the brake lever 8a–b has been pulled to the braking position which is defined by the existing brake clearance and the elasticity of the linkage the lever part 8b is locked to the toothed segment 72 by means of the pawl 78, the ratchet 70 and the pinions 71. Even in this position the spring 95 keeps the lever part 8a in the stopped position in engagement with the lever part 8b.

*Release.*—To release the brake the lever 8a–8b is first pulled to such an extent as to relieve the pawl 78 operative at that time. To this end the push button 7 can be pressed in in order to put the pawls 78 and 75 entirely out of engagement with the ratchet 70 so that the brake can be released and the lever 8a–8b can be returned to the releasing position, as previously described. Both pawls 78 and 75 can perform a limited swinging movement only when they are lifted from the locking position. Otherwise, even if both pawls are relieved, it could happen that one of the pawls due to greater frictional forces or the like is retained in the locking position, whereas the other pawl would swing away unnormally long as the push button 7 is pressed in. The stop dog 80 on the pawl 75 and the corresponding abutting surface of the pawl 78 ensure that the pawl which for some reason remains in engaged position will be disengaged under all conditions after the easily movable pawl has reached its stop position.

II. *Without pneumatic operation*

*Application.*—The lever 8a–8b is pulled as a single unit until the brake clearance of the brake shoes is completely taken up. During this operation the brake lever is directly connected to the bellows rod 6a–b (FIG. 1a). Since there is no servo force present, the lever cannot be pulled in a single stroke to the final braking position. However, the lever part 8b is retained in its existing locking position by means of the pawl 78. Now the lever part 8a together wth the handle is swung toward the brake releasing position. Since at that time the lever part 8b is locked to the toothed segment 72, the pinions 71 and the ratchet 70 are at a rest so that the pawl 75 can slide over some of the teeth of the ratchet. When the lever part 8a is moved again in the brake applying direction the pawl 75 will turn the ratchet 70 and the pinions 71 through a certain angle and the pinions will act as planet wheels and travel on the toothed segment 72. Since the pinions 71 are mounted on the pivot 59 provided in the lever part 8b, this lever part, too, will be turned through a certain angle to a new locking position. The pinions, toothed segments and the two lever parts form a change gear which renders possible a considerable increase of the force on the bellows rod 6a–b as compared with the manual force exerted on the lever part 8a. By repeated pulls on the lever part 8a full brake power, if needed, can be exerted on the wheels without pneumatic operation.

*Release.*—Release of the brake is effected stepwise in opposite sequence of operations. To begin with, the lever part 8a is moved along one tooth of the ratchet 70 in the releasing direction and is then slightly pulled back in the braking direction so as to relieve the pawl 78 for the lever part 8b, whereas the pawl 75 is loaded. The pawl 78 can now be completely disengaged from the ratchet 70 by pressing in the push button 7 which via the push rod 91, lever 88, bell cranks 76 and the arcuate arm 84 acts upon the pawl 78. If thereupon the lever part 8a is moved completely in the releasing direction, the lever part 8b will also be swung through a small angle in the same direction and be locked in a new position upon releasing the push button 7. As a result, the pawl 78 will be loaded again, and upon renewed pressing of the button 7 the pawl 75 will be disengaged so that the lever part 8a can be swung in the brake applying direction. By means of the lever part 8a and the push button 7 these operations are repeated until both lever parts assume their normal releasing positions.

Figure 9:
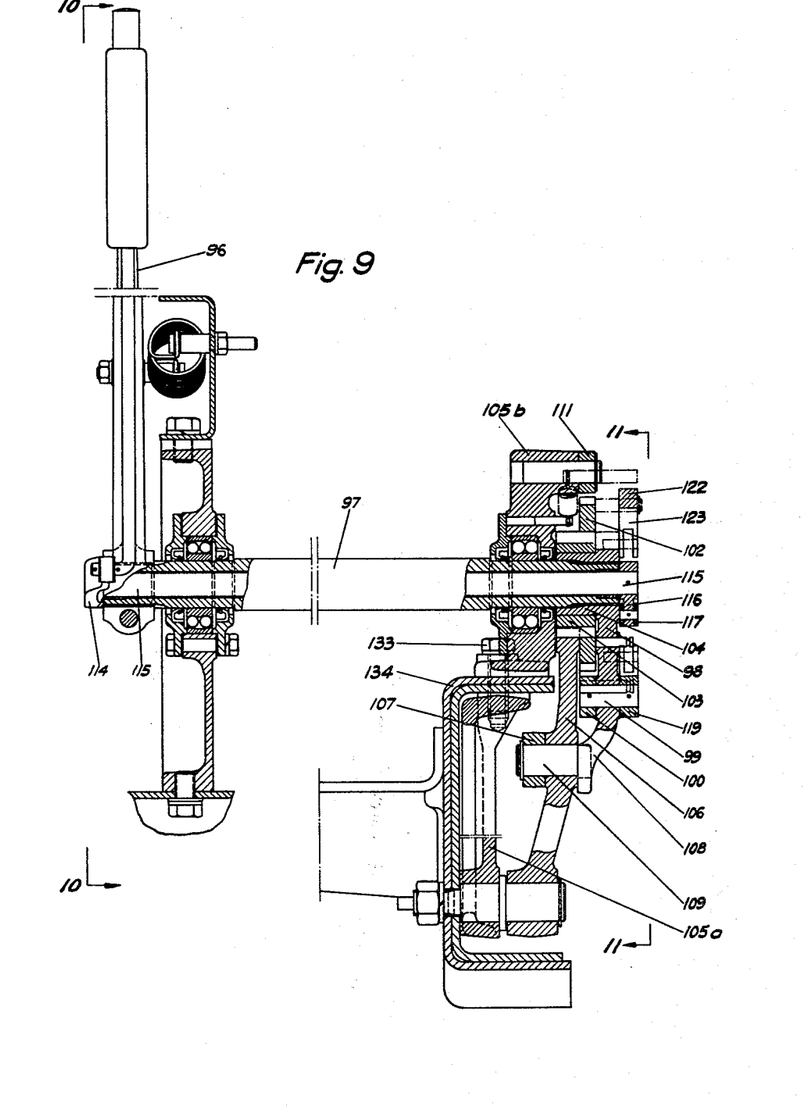
FIG. 9 is a view taken on line 9—9 of FIG. 11.
Figures 10, 11:
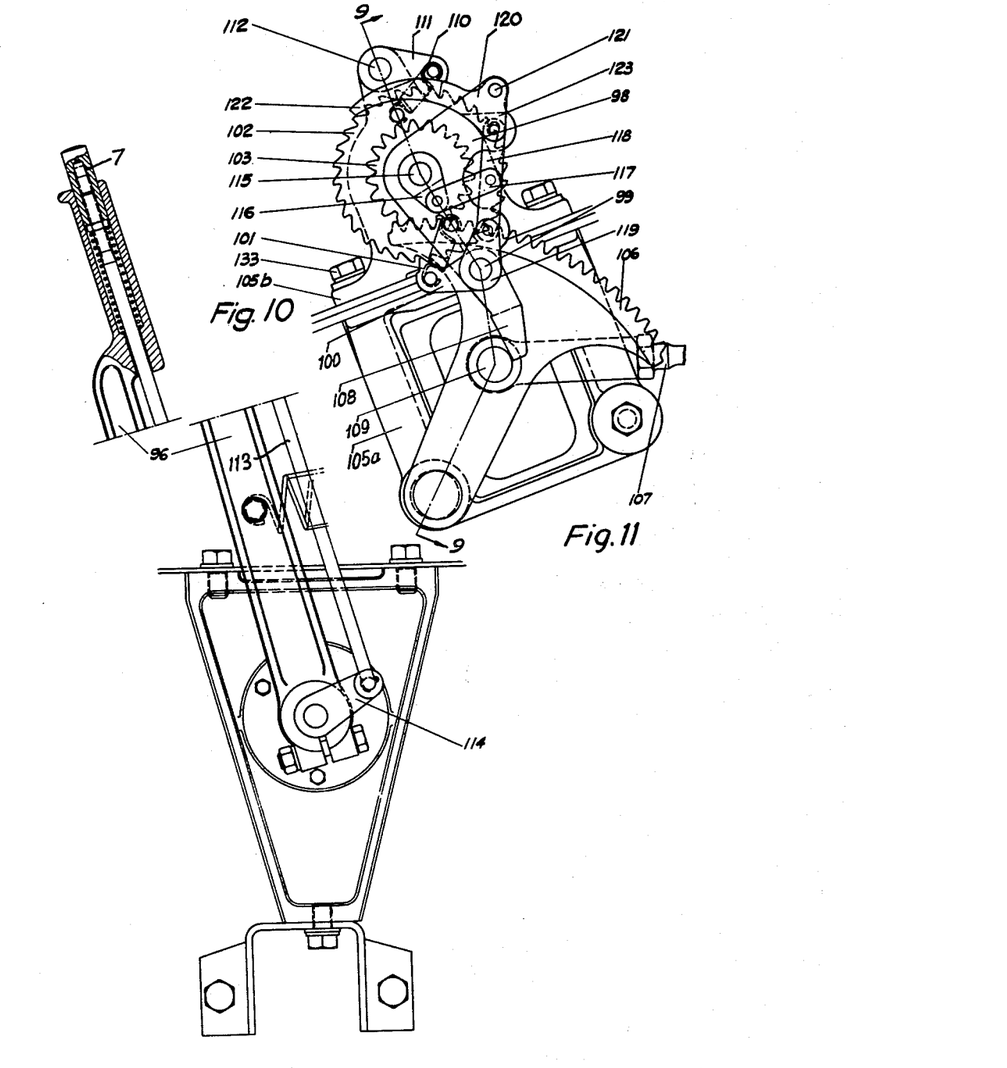
FIG. 10 is a view taken on line 10—10 of FIG. 9.
FIG. 11 is a view taken on line 11—11 of FIG. 9.

In certain cases the servo device with appertaining locking device and change gear cannot be placed close to the driver, but have to be located remote therefrom. Such an arrangement is illustrated in FIGS. 9 to 11, the servo device itself being omitted from considerations of space.

From the brake lever 96 in the driving compartment movement is transmitted, through a tubular shaft 97 mounted in two ball bearings, to a dog 98. A journal 99 mounted in the dog carries a pawl 100 which by means of a helical tension spring 101 is kept in engagement with a ratchet 102 located laterally of the dog. The ratchet is mounted coaxially and non-rotatably with respect to a pinion 103 which is loosely mounted on a neck 104 of the dog 98.

The pinion 103 is in permanent mesh with a toothed segment 106 which is pivotally mounted in a bracket 105a and, in the manner previously described, by means of a link connected with the bellows rod and valve device of the servo device.

The dog 98 has an extended arm 108 which normally abuts a pivot 109 mounted in the toothed segment 106. This pivot is also connected to the link 107 which connects to the bellows rod of the servo device.

A pawl 111 loaded by a spring 110 is mounted on a pivot 112 connected to the bracket 105b. In engagement with the ratchet 102 the pawl retains the entire braking mechanism locked in the releasing direction. The brackets 105a, b are by means of common screws 133 secured to a frame beam 134.

In the present case, the pawls are actuated by the push button 7 of the brake lever via an operating rod 113 mounted on the brake lever and articulated to a lever 114 which is provided at one end of an operating shaft 115 which extends through the tubular shaft 97. A short link 117 connects a lever 116 at the other end of the operating shaft to a balance 118 the ends of which are articulated to levers adapted to disengage the pawls from the ratchet 102. The pawl 100 is non-rotatably connected with the lever 119 connected to one end of the balance, and the pawl 111 can be actuated by a two-armed lever 120 which is mounted on a pivot 121 on the bracket 105. The arm 122 of the lever that cooperates with the pawl 111 is arcuate and its other end 123 is articulated to the balance 118.

MODE OF OPERATION

I. *With pneumatic operation*

*Application.*—The brake lever 96 acts directly on the servo device and the link system of the wheel brakes via the tubular shaft 97, dog 98, pivot 109 and link 107, and the system is locked by means of the pawl 111. If for some reason the air under pressure escapes from the servo motor in the applied position of the brake the pawl 111 will take up the substantially constant brake power. In this case, the pinion 103 and the toothed segment 106 take no part in the power transmission.

*Release.*—Release takes place substantially in the same manner as in the arrangement according to FIGS. 5 to 8.

II. *Without pneumatic operation*

*Application.*—In a first step the brake lever is pulled so far that the brake clearance of the brake shoes is completely taken up. During this step, the dog 98 carries directly along with it the toothed segment 106, link 107, bellows rod and the other linkage which is retained in locking position by means of the pawl 111. The brake lever is then moved forward again, resulting in that the dog arm 108 is swung back from the pivot 109 providing for a clearance between the arm and the pivot. Upon continued tightening of the brake lever the pawl 100 on the dog, the ratchet 102 and the pinion 103 will be moved by the lever and the toothed segment 106 will be further swung resulting in an increased tractive force in the linkage connected to the brake shoes. The pawl 111 now maintains the system in the new position. If the brake power has to be further increased the brake lever has to be swung forward and tightened further once or a plurality of times.

*Release.*—The brakes are released substantially by the same operations of the brake lever and push button as described with reference to FIGS. 5 to 8.

Figures 12, 13:
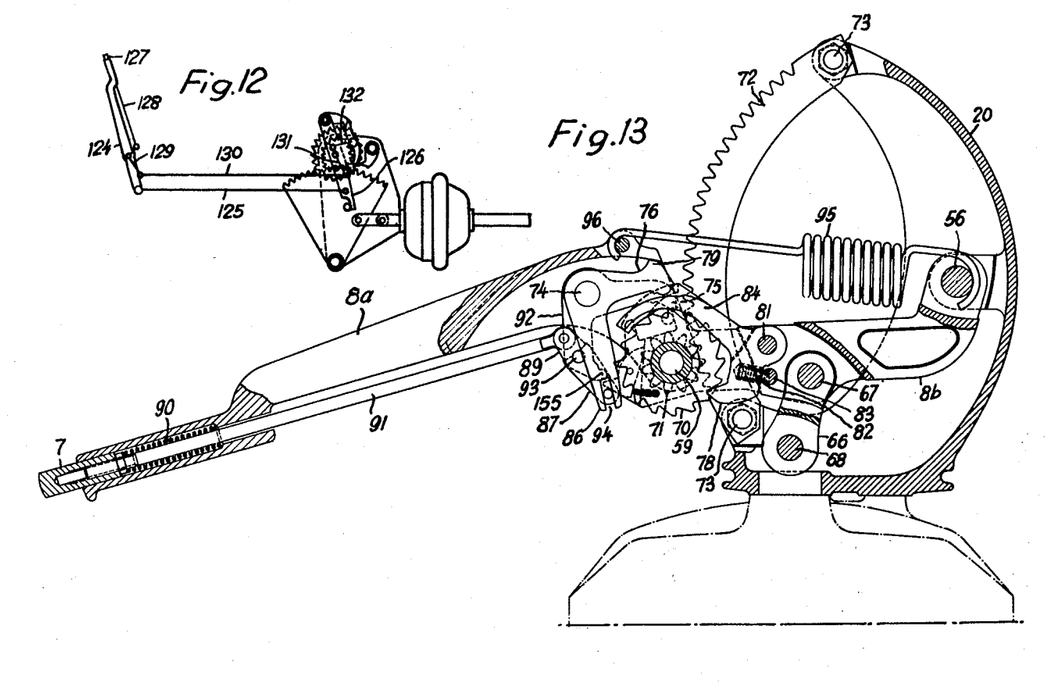

FIG. 12 illustrates a modified embodiment for the operation of a servo device associated with a locking device and change gear of the type shown in FIGS. 9 to 11 and located remote from the brake lever. Here, the brake lever 124 is in the form of a two-armed lever the lower end of which is by means of a link 125 connected to a dog 126 corresponding to the dog 98 in FIGS. 9 and 11. The operating rod 128 which is actuable by the push button 127 and displaceable in the brake lever 124 has its lower end articulated to one arm of a two-armed lever 129 which is pivotally mounted on the lever 124. The other arm of the lever 129 is by means of a link 130 which is parallel to the link 125 connected to a two-armed lever 131 which is mounted on the dog 126 and transmits the movement to a link 132 corresponding to the link 117 shown in FIGS. 9 and 11. The parallel links 125 and 130 are of equal length and form together a parallelogram linkage which enables the pawls to be actuated in all positions of the brake lever 124.

In operation of the arrangement shown in FIG. 5 it is necessary for each swinging movement of the brake lever alternately to press in and release the push button 7. FIGS. 13 to 16 illustrate a modified embodiment of the arrangement according to FIG. 5 wherein pressure can be applied to the button 7 all the time during the swinging movement of the lever during release of the brake without the necessity of actuation on applying the brake. In FIGS. 13 to 16 corresponding parts are denoted by the same reference numerals as in FIGS. 5 to 8.

Figures 14, 15, 16:
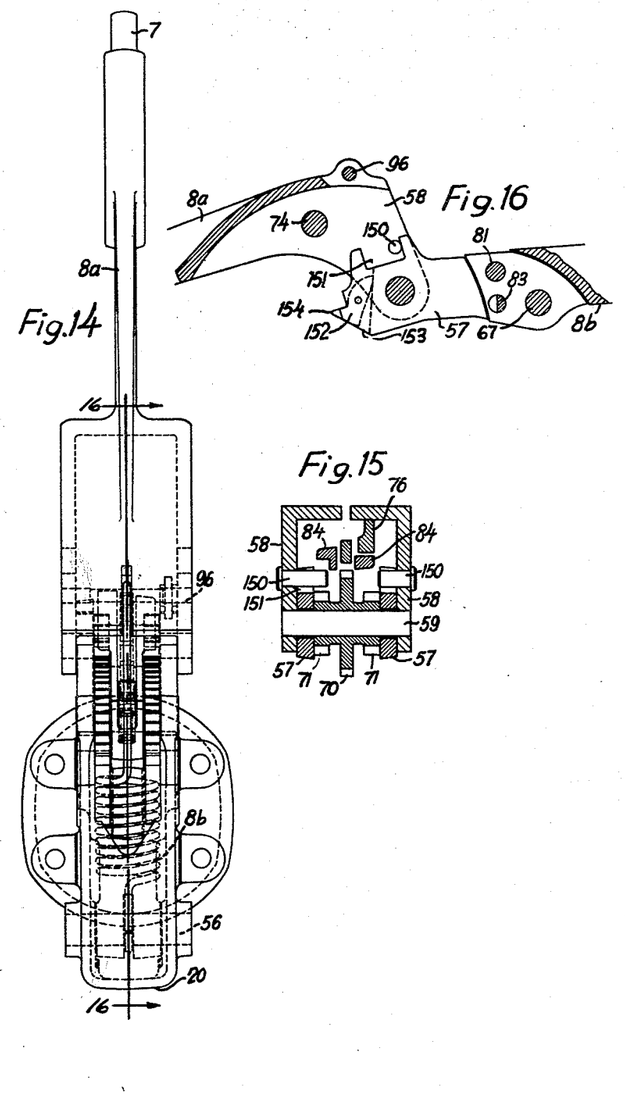

As will best be seen from FIG. 16 which is a sectional view along the line 16—16 in FIG. 14, the relative movement of the two lever parts 8a and 8b is limited by pins 150 which are secured to the lever part 8a and received in recesses 151 in the upper edges of the prongs 57 of the lever part 8b. In this instance, the prongs 57 are located inside the prongs 58 of the lever part 8a. Mounted on one of the prongs 57 of the lever part 8b is a rocker 152 which by a spring, not shown, is maintained in the position shown in FIG. 16 in which the upper end of the rocker engages in abutment surface of the prong, whereas the lower edge of the rocker is flush with a guide surface 153 on the lower side of the prong. In the position shown in FIG. 16, the pointed lower part 154 of the rocker 152 forms an extension of the guide surface 153.

In the embodiment according to FIG. 13, there is provided a single bell crank 76, and the two arcuate arms 84 of the pawl 78 are of different shape. One arm 84 of the pawl 78 is adapted to be actuated by the bell crank 76 on its outside curved surface, in order to move the pawl out of engagement with the ratchet 70, whereas the other arm 84 is adapted to be acted upon on its cam-shaped inside by one of the pins 150 such as to move the pawl 78 into engagement with the ratchet 70. As will be seen from FIG. 15 which is a sectional view taken along the line B—B in FIG. 13 the pin 150 in consideration is slightly extended inwardly for this purpose.

In FIG. 13 the parts are shown in the positions which they assume when the brake is applied. In this position, the pawl 78 mounted on the lever part 8b is in engagement with the ratchet 70 and highly loaded. The tip of the pawl 75 mounted on the lever part 8a bears upon the rear side of a ratchet tooth close to the tip thereof.

Figure 17A:
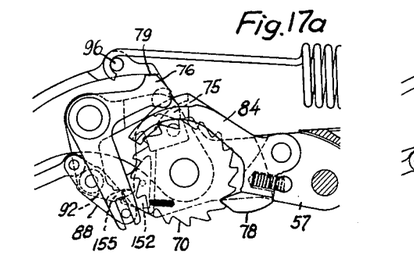

To release the brake without pneumatic operation, the lever part 8a is moved downwards from the position shown in FIG. 13, and the parts relevant in this connection assume at a certain moment the positions according to FIG. 17a. The pawl 75 is then ready to engage the ratchet 70, and a projecting part 155 at the free end 92 of the pawl 75 has been moved into contact with the end portion 154 of the rocker 152 and has turned the rocker through a small angle in the counter-clockwise direction.

Upon continued downward movement of the lever part 8a the position according to FIG. 17b is obtained. Here, the pawl 75 has engaged the ratchet 70, and the projecting part 155 of the pawl has been swung away from the rocker 152 which consequently has returned to the position shown in FIG. 13. The pawl 78 is still loaded.

After the lever part 8a has reached the position according to FIG. 17b it is swung in the clockwise direction or lifted, and its pawl 75 takes over the load and turns the ratchet 70 in the brake applying direction to the position according to FIG. 17c. During this movement, the pins 150 have come into contact with the right-hand endwalls of the recesses 151 so as to limit the swinging movement of the lever part 8a relative to the lever part 8b. At the same time, the pawl 78 has slid upwards on the rear side of a tooth of the ratchet 70.

In the position shown in FIG. 17c the button 7 is pressed in resulting in the position according to FIG. 17d. When the button is pressed in the bell crank 76 is turned in the clockwise direction and acts upon the underlying arm 84 of the pawl 78 which will be entirely disengaged from the ratchet 70. At the same time the other arm 84 of the pawl 78 is moved downwards so as to abut one of the pins 150 (to the left of FIG. 15).

From the position according to FIG. 17d the lever part 8a is again moved downward resulting in that the ratchet 70 is turned in the brake releasing direction. Under the cooperating action of the arms 84 of the pawl 78, the pin 150 and the bell crank 76, the pawl 78 is positively guided to renewed engagement with the ratchet 70. FIG. 17e illustrates an intermediate position during downward movement of the lever part 8a toward the position according to FIG. 17f in which the pawl 78 has been moved to its locking position.

During the angular movement of the lever part 8a from the position according to FIG. 17d to the position according to FIG. 17f and the consequent counter-clockwise turning movement of the ratchet 70 the pinions 71 have travelled somewhat downwards on the segments 72 so that the lever part 8b, too, has been moved in the brake releasing direction.

Figure 17G:
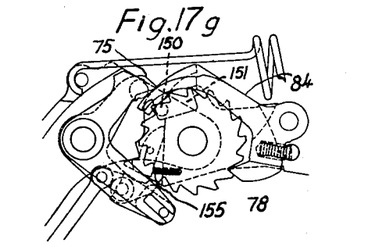

From the position according to FIG. 17f the lever part 8a is further swung down to the position according to FIG. 17g with the push button 7 still pressed inwards. In the lastnamed position the pawl 78 has again taken over the load and the pins 150 have engaged the opposite endwalls of the recesses 151. Since the push button 7 has been kept in pressed-in position, the pawl 75 has been completely disengaged from the ratchet 70, and its projecting part 155 has been moved into engagement with the guide surface 153 of the lever part 8b. The bell crank 76 is prevented from clockwise movement due to its abutment on the cooperating arm 84 of the pawl 78.

Figure 17H:
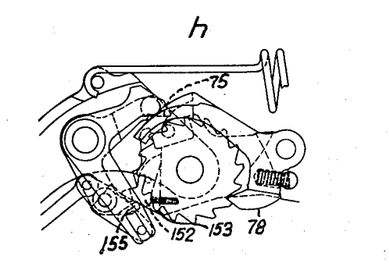

From the position according to FIG. 17g the lever part 8a is moved upwards as a result of which the projecting part 155 of the pawl 75 slides along the guide surface 153 so that the pawl is turned clockwise toward the ratchet 70. FIG. 17h illustrates an intermediate state of the movement, but in the position according to FIG. 17i the pawl 78 has completely engaged the ratchet 70. It will be seen from FIG. 17i that the projecting part 155 during the last part of the inward movement of the pawl is sliding on the extension of the guide surface 153 formed by the rocker 152.

Figure 17I:
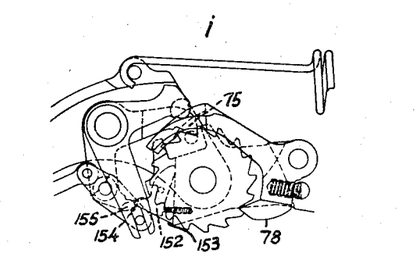

The position according to FIG. 17i corresponds to the position according to FIG. 17b except for the fact that in the lastnamed position the push button 7 is assumed to be not operated. If the lever part 8a is further moved upwards from the position according to FIG. 17i with the button 7 pressed in, the position according to FIG. 17d is obtained again whereupon the operation described with reference to FIGS. 17d to 17i is repeated until the tension on the brake linkage has been reduced to such an extent that the remaining releasing operation can be effected without the aid of the change gear.

This lastnamed step of the releasing operation is effected by moving the lever part 8a with pressed-in button 7 upwards from the position according to FIG. 17d, the lever part 8b being carried along by the pins 150. During this operation the ratchet 70 is slightly turned clockwise so as to relieve the pawl 75 which under the action of the force exerted on the push button 7 is disengaged from the ratchet 70. Now, the ratchet 70 is completely free and the lever part 8b can follow the lever part 8a during the following downward movement thereof, resulting in complete release of the brake.

The spring 95 normally keeps the lever part 8a in the position shown in FIG. 13. If it is desired to apply the brake without pneumatic operation, the lever part 8a with released button 7 is moved down to a position corresponding to the position according to FIG. 17g. During this movement the pawl 75 snaps into engagement with the ratchet 70 under the action of the push button spring 90. When the lever part 8a thereupon is moved upwards, the ratchet 70 will be turned in the brake applying direction. It should be noted that during application of the brake the stop dog 79 of the bell crank 76 bears on its abutting surface of the lever part 8a resulting in that the pawl 78 is not positively controlled, but is acted upon solely by its spring 82. Similarly, the pawl 75 is acted upon by the push button spring 90. By swinging the lever part 8a with released push button 7 to and fro between the end positions defined by the pins 150 and recesses 151 the ratchet can be turned stepwise in a clockwise direction during which operation the pinions 71 are travelling upwards on the segments 72 whereby to apply the brake.

At the beginning of a brake applying operation the lever parts 8a and 8b are of course moved upwards together as far as is possible by manual force before starting the brake applying operation by means of the change gear.

From the above it will be apparent that in the arrangement according to FIG. 13 the push button 7 is maintained in pressed-in position during the entire releasing operation. Nevertheless, the button 7 performs a certain inward and outward movement as the lever part 8a is swung to and fro. During application of the brake, however, the push button need not be actuated manually.

The invention is not limited to the embodiments illustrated the details of which may be modified within the scope of the appending claim.

What we claim is:

A vehicle hand brake comprising a braking mechanism for the wheels of the vehicle, a brake lever adapted to be actuated by the operator of the vehicle, and linkage means extending between said brake lever and said braking mechanism, said linkage means including therein a fluid actuated servo device for power amplification, a locking device interposed between said brake lever and a fixed support, said locking device comprising a catch element in the form of a worm secured to a shaft which is pivotally and rotatably mounted on said brake lever and operable by means of a push button mechanism on said lever to be swung into and out of engagement with the teeth of a locking segment secured to said fixed support, releasable locking means being provided between said shaft and said lever to prevent unintentional rotation of said worm relative to said lever and said segment, and means on said worm shaft enabling the same to be rotated manually when said locking means are released.

References Cited by the Examiner

UNITED STATES PATENTS

| | | | |
|---|---|---|---|
| 1,650,286 | 11/27 | Livingston | 188—152 |
| 3,003,825 | 10/61 | Kemble | 303—54 |
| 3,012,751 | 12/61 | Hauser | 92—110 X |

FOREIGN PATENTS 974,604  2/61  Germany.

ARTHUR L. LA POINT, *Primary Examiner.*

EUGENE G. BOTZ, *Examiner.*